No. 670,664. Patented Mar. 26, 1901.
J. CAULFIELD.
WHEEL FOR HORSELESS CARRIAGES.
(Application filed Oct. 10, 1900.)
(No Model.) 2 Sheets—Sheet 1.
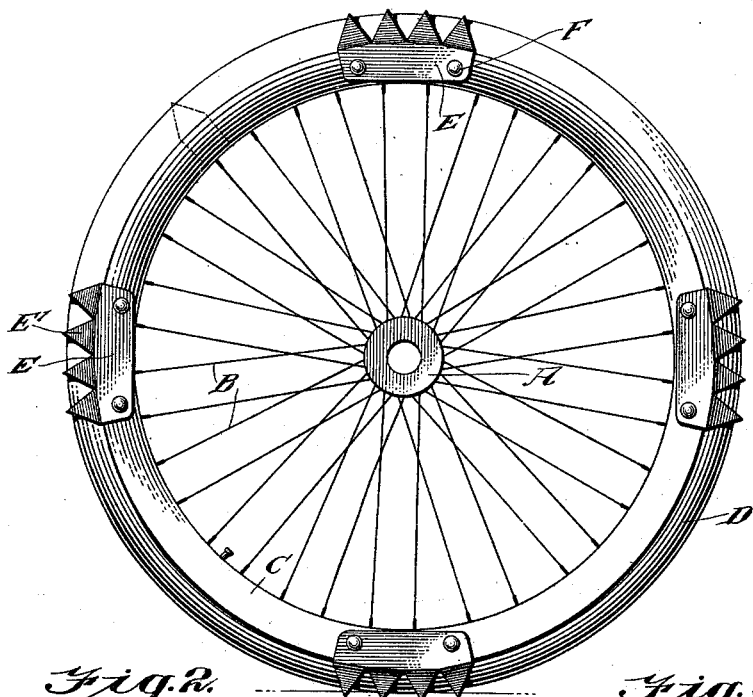
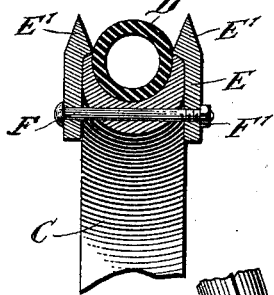
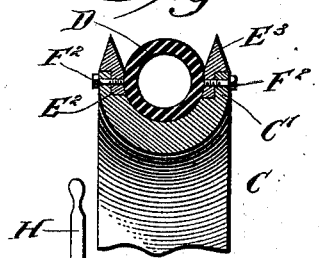
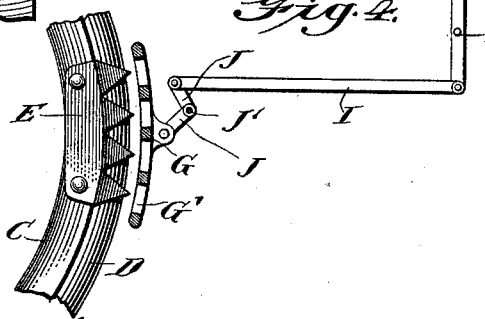
WITNESSES:
H. G. Dieterich
John Lotta
INVENTOR
John Caulfield
BY
ATTORNEYS No. 670,664. Patented Mar. 26, 1901.
J. CAULFIELD.
WHEEL FOR HORSELESS CARRIAGES.
(Application filed Oct. 10, 1900.)
(No Model.) 2 Sheets—Sheet 2.

WITNESSES:
H. G. Dieterich
John Lotka

INVENTOR
John Caulfield
BY
Munn
ATTORNEYS

UNITED STATES PATENT OFFICE.

JOHN CAULFIELD, OF BROOKLYN, NEW YORK.

WHEEL FOR HORSELESS CARRIAGES.

SPECIFICATION forming part of Letters Patent No. 670,664, dated March 26, 1901.

Application filed October 10, 1900. Serial No. 32,594. (No model.)

*To all whom it may concern:*

Be it known that I, JOHN CAULFIELD, a citizen of the United States, and a resident of the city of New York, borough of Brooklyn, in the county of Kings and State of New York, have invented new and useful Improvements in Wheels for Horseless Carriages, of which the following is full, clear, and exact description.

My invention relates to horseless carriages, and has for its object to provide means for enabling the pneumatic or rubber tired wheels of such carriages to firmly grip the ground and to prevent slipping when traveling over slippery surfaces, as mud, ice, or snow. For this purpose I provide a particular novel construction according to which the wheel is provided with teeth or projecting gripping members at each side of the rubber tire. The details of this construction will be fully described hereinafter and the features of novelty pointed out in the appended claims.

Reference is to be had to the accompanying drawings, forming a part of this specification, in which similar characters of reference indicate corresponding parts in all the figures.

Figure 5:
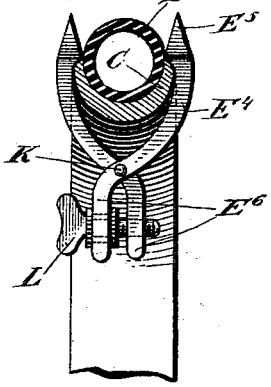
Figure 6:
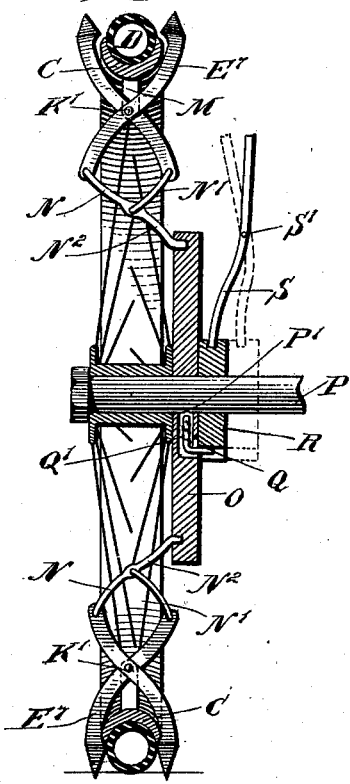
Figure 7:
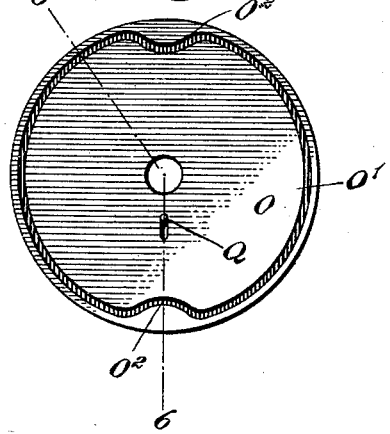
Figure 8:
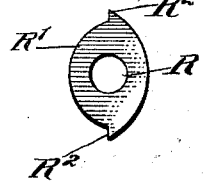

Figure 1 is an elevation of a wheel provided with my improvement. Fig. 2 is a cross-section through the rim, the tire, and the gripping members. Fig. 3 is a view similar to Fig. 2 and illustrating another manner of attaching the gripping members to the rim. Fig. 4 is a partial side elevation representing a brake designed to coöperate with the said gripping members. Fig. 5 is a sectional elevation showing a readily-detachable form of the gripping members. Fig. 6 is a sectional elevation of a wheel provided with permanently-attached gripping members and with a mechanism for throwing them into and out of an operative position, and Figs. 7 and 8 are detail views of two cams forming part of the mechanism shown in Fig. 6.

In the drawings, A is the hub of the wheel; B, the spoke; C, the rim, and D the rubber tire. According to my invention I provide gripping members or teeth projecting from the rim at each side of the tire D. As shown in Figs. 1 and 2 these teeth E' are formed upon plates E, secured to the rim at intervals, by means of bolts and nuts F F', passed through the rim and through the plates E. The latter, as represented, have four teeth each; but it will be understood that each plate may have only one tooth, as indicated in dotted lines in Fig. 1, or a greater number of teeth. Also the number of plates may be varied, and, if desired, the teeth may extend entirely around the periphery of the wheel. In any event the teeth are located upon opposite sides of the tire D, preferably in transverse registry with each other. The points of the teeth may be approximately flush with the outer surface or tread of the tire, or they may project slightly beyond the tire, as shown in the drawings. The plates have shoulders seated on the edges of the rim.

The operation is as follows: The teeth E' will project from the tire, at least at that portion where the tire is flattened by contact with the ground, and will thus enter the ground and take a firm hold thereof, preventing the wheel from slipping and rendering the motive power fully available. When, as in Fig. 1, the teeth E' normally project from the tire, they will project to a greater extent at the lower portion of the wheel, so as to sink deeper into the ground.

In Fig. 3 I have represented a construction in which the rim C has a flange C', formed with a recess upon its inner face to receive the shanks $E^2$ of teeth $E^3$, which may be single teeth or several of them on a common plate, as hereinbefore described. The shanks $E^2$ thus fit between the tire D and the rim C and are secured to the latter by means of rivets or screws $F^2$ or their equivalents. It will be seen that in this construction the plates or shanks on opposite sides of the wheel are fastened to the rim individually.

In the constructions shown the teeth or gripping members are separably attached to the wheel, so that they may be readily removed from the wheel when favorable weather conditions render them unnecessary. It will be obvious, however, that the teeth may form an integral part of the rim, in which case the owner of the carriage will provide himself with two sets of wheels, to be used as the condition of the ground may require.

The gripping members or teeth hereinbefore described may be utilized for a powerful braking action, as illustrated by Fig. 4. Here the teeth E' are adapted to enter apertures G' of a brake-shoe G, which may be moved toward and from the wheel by any suitable mechanism—for instance, by a lever H, fulcrumed at H' and connected by a link I with the lever J, fulcrumed at J' and pivotally supporting the brake-shoe G. When the brake is put on, the teeth enter the apertures G' and the wheel is practically locked, although if the speed is very high the beveled teeth can slip from one set of openings G' into the next, so as to avoid breaking the teeth or the brake-shoe in the event of a sudden stop.

In Fig. 5 the gripping members $E^4$, having the teeth $E^5$, are similar to those shown in Fig. 2 in that they have shoulders to take over the outer edges of the rim C; but instead of being separate they are connected by a pivot K and by a clamp formed of a screw L, engaging the inner ends $E^6$ of the gripping members $E^4$. The manner of fastening and detaching these gripping members will be obvious, and it will be understood that they may be applied to any portion of the rim and do not weaken it by perforations. Moreover, the two mating gripping members always remain connected and in the proper registering position.

In all the constructions hereinbefore described the carriage must be stopped in order to remove the gripping members when their use is not desired. In Figs. 6, 7, and 8 I have shown a construction by which the operator is enabled to throw the gripping members into an operative or inoperative position from his seat. For this purpose the gripping members $E^7$ are fulcrumed, as at K', upon brackets M or other supports projected from the inner surface of the rim C. The position shown at the bottom of Fig. 6 is the operative position, while at the top of Fig. 6 the teeth of the gripping members are spread apart, so as to no longer project beyond the tread-surface of the tire D. The inner ends of the gripping members $E^7$ are connected with toggle-links N N', one of which has an extended arm $N^2$ engaging a cam-groove O' in a plate O, which may be held to rotate with the shaft P by means to be described presently. The groove O' is circular in its main portion, but has two inward bends, as at $O^2$, and these bends are so located that when the plate O is locked to the shaft the arms $N^2$ are all engaged with the circular outer portion of the groove O', so that the gripping members are all in the open or inoperative position. The locking device consists of a pin Q, held to slide radially in the plate O and pressed inward by a spring Q' into an opening P' in the shaft P, said opening and locking-pin being located to secure the result indicated above—that is, when the plate O is locked to the shaft all the gripping members are in their inoperative position. Should the plate O be held stationary with one of the bends $O^2$ at the bottom while the wheel rotates, the gripping members $E^7$ will obviously be closed or brought into the operative position whenever they reach their lowermost position adjacent to the ground, as shown in Fig. 6. The benefit of the gripping action of the teeth will thus be obtained, the result being the same as in the constructions first described. To hold the plate O stationary when desired, I provide a cam-sleeve R, mounted to slide on the shaft P, but held against turning therewith, and operated by means of a shifting lever S, fulcrumed at S' on the frame of the carriage and adapted to be moved by the operator directly or indirectly. This sleeve has a cam-surface R' and two stop-shoulders $R^2$. Should the sleeve be moved inward—that is, toward the plate O—the end of the locking-pin Q will engage the cam-surface R', and as the pin rotates with the shaft it will ride on said cam-surface until it is disengaged from the shaft and strikes one of the stops $O^2$, according to the direction in which the vehicle is running. The plate O will thus be held stationary and the gripping members thrown into the operative position each time they reach the bottom of the wheel, as above described. As a rule it will be sufficient to provide means for throwing the gripping members into an operative position during the forward motion of the vehicle, and in such case the device can be simplified by the omission of one of the inward bends $O^2$ of the groove O' and one of the stop-shoulders $R^2$.

Having thus described my invention, I claim as new and desire to secure by Letters Patent—

1. A vehicle-wheel, provided with a rim, a compressible tire, and gripping members projecting from the rim at each side of the tire to engage the ground.

2. A vehicle-wheel, provided with a rim, a compressible tire, and gripping members secured to the rim detachably and projecting therefrom at each side of the tire to engage the ground.

3. A vehicle-wheel provided with a rim, a compressible tire, and gripping members secured to the rim detachably and provided with shoulders extending over the edges of the rim, the said gripping members being located at each side of the tire and adapted to engage the ground.

4. A vehicle-wheel, provided with a compressible tire, a rim upon which said tire is seated, the rim having its edge portions spaced from the tire, and detachable gripping members provided with shanks fitted between the tire and the edge portions of the rim, said members being located at each side of the tire and adapted to engage the ground.

5. A vehicle-wheel, provided with a rim, a compressible tire, gripping members projecting from the rim at each side of the tire, and a brake-shoe adapted for engagement with said gripping members.

6. A vehicle-wheel, provided with a rim, a compressible tire, teeth projecting from the rim at each side of the tire, and a brake-shoe provided with recesses for the reception of said teeth.

7. A vehicle-wheel, provided with a rim, a compressible tire, opposing gripping members connected with each other pivotally and adapted to project from the rim at each side of the tire, and means for pressing the said members into contact with the rim.

8. A vehicle-wheel, provided with a rim, a compressible tire, opposing gripping members connected with each other pivotally and adapted to project from the rim at each side of the tire, an operating-cam connected with said pivoted gripping members and capable of different positions with respect to the wheel, to throw the gripping members into an active or inactive position, and means for operating said cam.

9. A vehicle provided with a wheel, a rim, a compressible tire, opposing gripping members connected with each other pivotally and adapted to project from the rim at each side of the tire, toggle-links connected with the inner ends of the gripping members, an operating-cam connected with said toggle-links, and capable of different positions with respect to the wheel, to throw the gripping members into an active or an inactive position, and means for operating said cam.

10. A vehicle provided with a wheel, a rim, a compressible tire, opposing gripping members connected with each other pivotally and adapted to project from the rim at each side of the tire, an operating-cam connected with said pivoted gripping members, means for normally compelling the said cam to turn with the wheel, and mechanism for releasing the cam from the wheel and holding the cam stationary to throw the gripping members into an operative position.

11. A vehicle-wheel, provided with a rim, a compressible tire, opposing gripping members connected with each other pivotally and adapted to project from the rim at each side of the tire, an operating-cam connected with said pivoted gripping members, a spring-pressed pin for normally compelling the said cam to turn with the wheel, with the gripping members in an inoperative position, a non-rotatable sleeve slidable on the shaft and having a cam-surface to disengage said pin from the wheel, and a stop-surface to hold the operating-cam stationary.

In testimony whereof I have signed my name to this specification in the presence of two subscribing witnesses.

JOHN CAULFIELD.

Witnesses:
JOHN LOTKA,
JOHN T. GILDEA.